United States Patent [19]

Mack

[11] 3,720,062

[45] March 13, 1973

[54] LIQUID CONFINING AND COLLECTING APPARATUS

[76] Inventor: William T. Mack, 2527 Azalea, Tyler, Tex. 75701

[22] Filed: July 9, 1970

[21] Appl. No.: 53,586

[52] U.S. Cl. .................................61/1 F, 210/242
[51] Int. Cl. ..........................E02b 15/04, B01d 21/00
[58] Field of Search ...............61/1, 5; 210/242, 210

[56] References Cited

UNITED STATES PATENTS

| 3,592,008 | 7/1971 | Trindle | 61/1 F |
| 3,624,701 | 11/1971 | Kingsley | 61/1 F |
| 3,592,005 | 7/1971 | Greenwood | 61/1 F |
| 3,533,240 | 10/1970 | Lesh | 61/5 |

FOREIGN PATENTS OR APPLICATIONS

| 1,528,855 | 5/1968 | France | 61/1 R |
| 1,032,121 | 1958 | Germany | 210/242 |
| 1,163,173 | 1969 | Great Britain | 61/1 |
| 739,171 | 1932 | France | 61/1 |

Primary Examiner—Jacob Shapiro
Attorney—Hyer, Eickenroht, Thompson & Turner

[57] ABSTRACT

There is disclosed an elongate, impervious barrier which is flexible intermediate its ends and has upper and lower faces which converge forwardly to intersect on its front side. Buoyant means is carried by the barrier to normally maintain it in a generally upright position within a body of water and with the intersection of the upper and lower faces below a lighter phase thereof.

16 Claims, 7 Drawing Figures

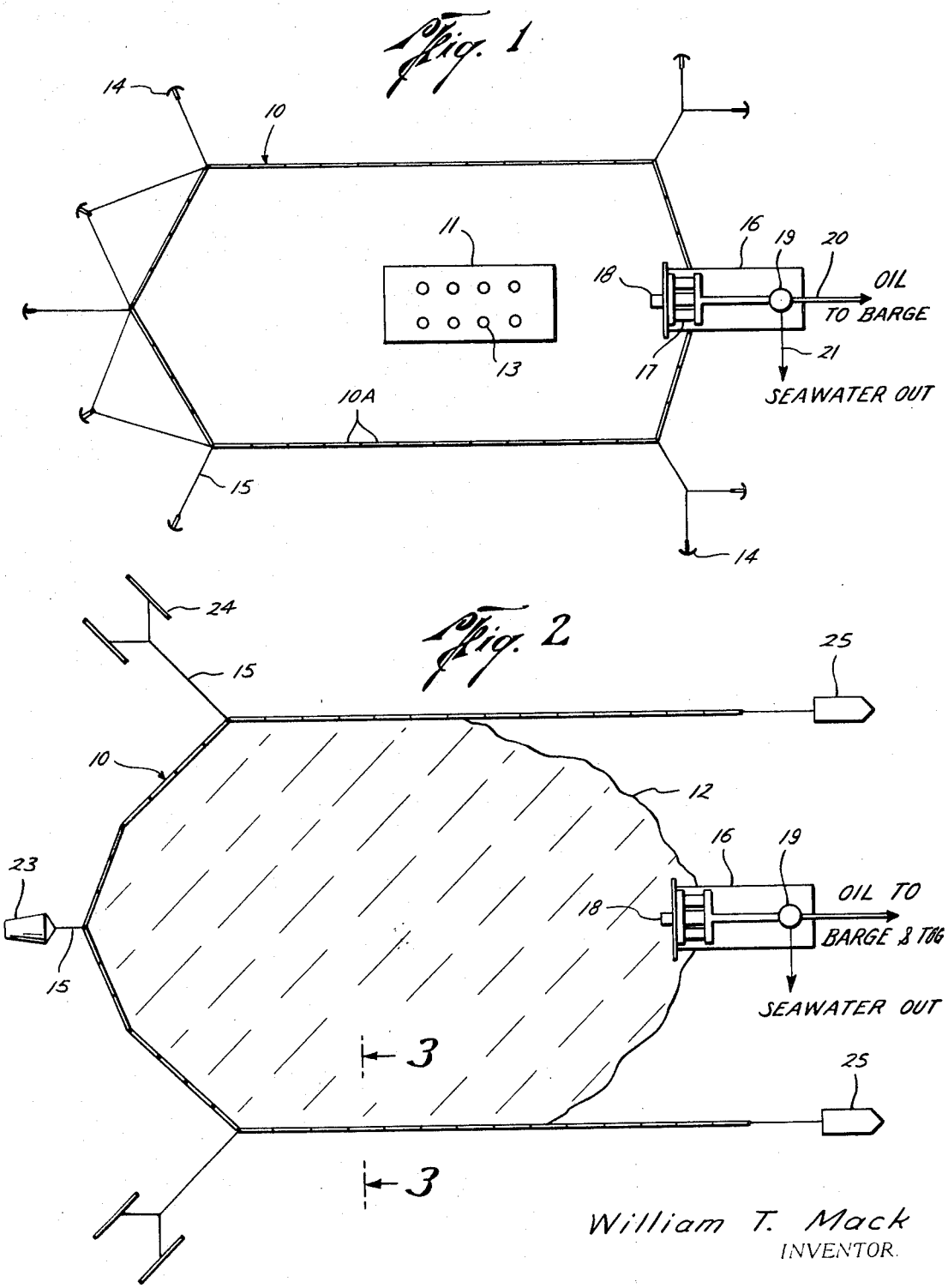

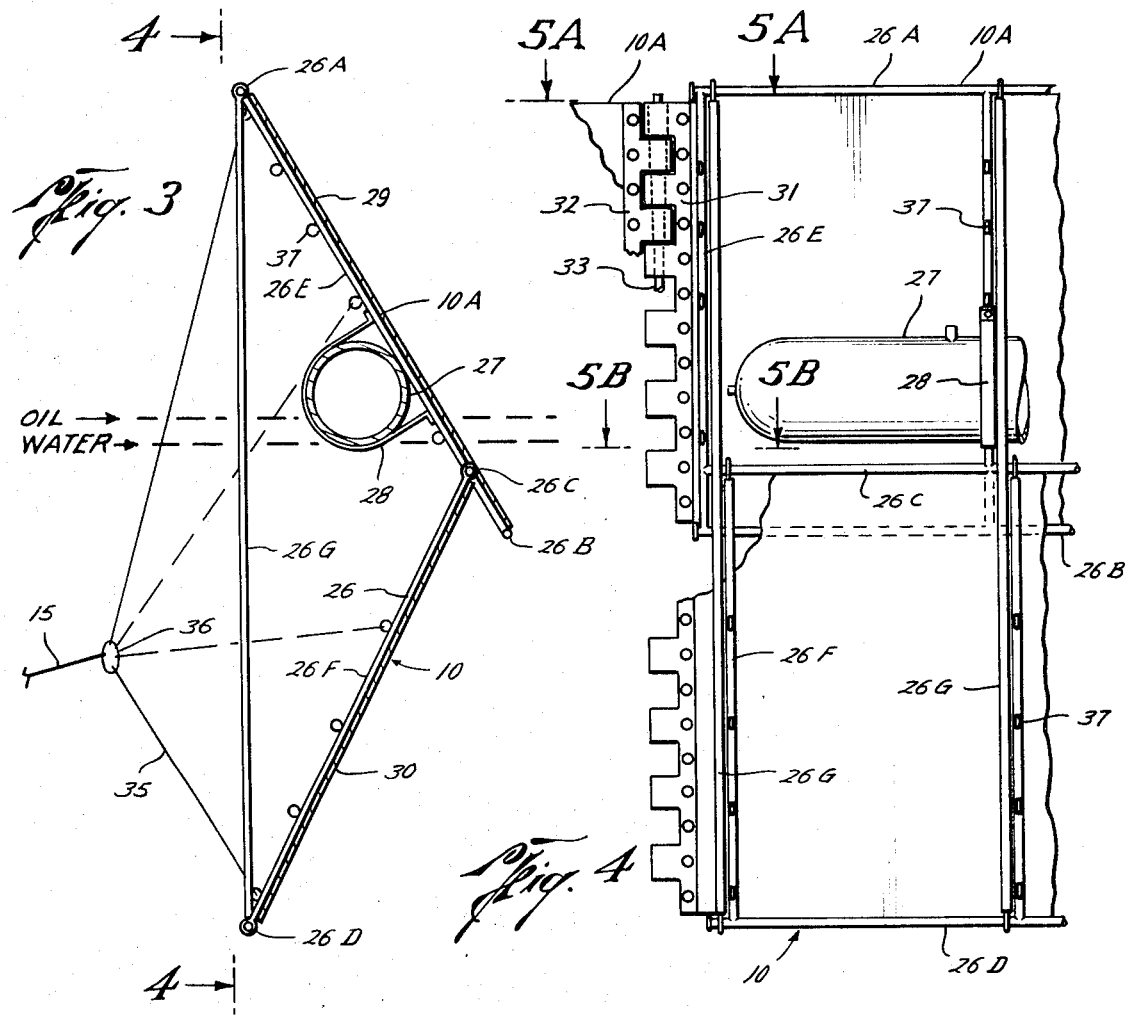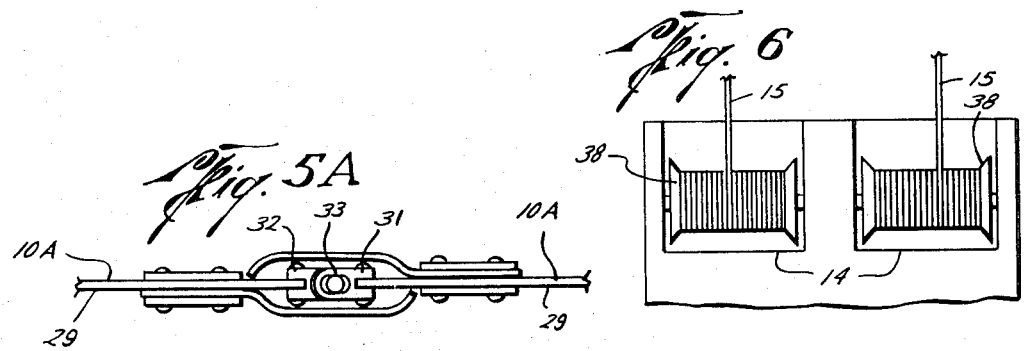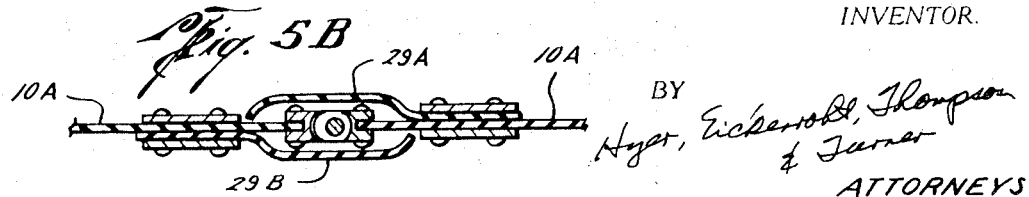

LIQUID CONFINING AND COLLECTING APPARATUS

This invention relates to apparatus for use in confining and collecting a lighter phase above a heavier phase of a body of liquid. More particularly, it relates to improved apparatus of this type which includes an elongate barrier adapted for disposal in the ocean or a large body of inland water for use in confining and collecting oil spills or other pollutants.

Much attention has been given lately to oil spills which frequently occur due to a break in an offshore oil well and which may, unless confined and/or collected, pollute or contaminate surrounding areas. Until the present time, efforts in this field have been primarily remedial in nature — i.e., after the spill occurs. I contemplate that this invention may be used with equal, if not greater, effect as a preventative measure — i.e., before the spill occurs.

Known barriers of this type comprise an elongate wall which is impervious and flexible from end-to-end and which carries buoyant elements to maintain it in an upright position in the water with its lower edge beneath the oil level. Thus, the barrier may be moved into confining position about the oil spill by means of towing barges to permit the oil spills to be collected for removal from the body of water by means of suction equipment adapted to be moved into the confined area. However, considerable difficulty has been encountered in the use of these barriers, primarily in maintaining them in an upright, confining position. That is, they have had a tendency to lean away from an upright position, and even turn over, due to the tide and winds, and particularly rough waters, thereby permitting the oil spill to escape beyond their bounds.

An object of this invention is to provide apparatus of this type including a barrier which will remain in confining position even in extremely rough waters.

Another object is to provide such apparatus in which the barrier positively resists and opposes any tendency for the oil spill to wash beneath it.

A further object is to provide such apparatus which is adjustable for optimum performance during varying weather conditions.

Yet another object is to provide such apparatus which is influenced to a minimum extent by rough waters, and particularly in which the barrier is maintained with its lower edge at approximately the same depth in the water and thus relative to the level of the oil spill.

Still another object is to provide apparatus having a barrier of this type which is of simple and inexpensive construction.

These and other objects are accomplished, in accordance with the illustrated embodiments of the present invention, by apparatus including a barrier having upper and lower faces which converge forwardly to intersect on the front side of the barrier, and buoyant means for normally maintaining the barrier in a generally upright position within the body of liquid and with the intersection below the level of the oil spill or other lighter phase. Preferably, the upper front face of the barrier forms an angle of about 25° and the lower front face forms an angle of about 35° to the vertical when the barrier is in its generally upright position, and the buoyant means is carried on the back side of the barrier with its center of flotation at a level above the intersection and generally vertically aligned with the center of gravity of the barrier.

With the apex below the oil spill, there is little opportunity for the oil to pass beneath it and thus over the lower face of the barrier. Furthermore, the barrier is stable in the water and strongly resists leaning or overturning, particularly when pulled against the wind and tide. Thus, when the barrier is used in this manner, the wind creates an upward force on the upper face and the water a downward force on the lower face of the front side of the barrier due to the air foil effect caused by the above-described angular relation of the faces with respect to the vertical.

The barrier also has a lip on its front side which extends downwardly past the intersection, and preferably forms a substantial continuation of the upper front face of the barrier. The lip creates eddy currents between it and the lower front face of the barrier which oppose the flow of oil which might pass beneath the apex. Also, bridles attach the back side of the barrier to anchors or the like so as to add further to its stability.

In one embodiment of the invention, the bridle is connected to one or more sea anchors which provide sufficient drag to hold the barrier in a substantial U shape as its opposite ends are pulled into confining positions about the oil spill. In another embodiment of the invention, the bridles are attached to permanent anchors which hold the barrier in a generally stationary position surrounding a structure from which oil spill may occur. Preferably, the permanent anchors are yieldably attached to the bridles to permit the barrier to rise and fall with the tides and rough waters, and thus maintain its lower edge at a substantially constant level therein.

In the drawings, wherein like reference characters are used throughout to designate like parts:

FIG. 1 is a diagrammatic plan view of a barrier constructed in accordance with this invention and having permanent sea anchors attached thereto to hold it in a position surrounding an offshore platform;

FIG. 2 is a view similar to FIG. 1 showing the barrier with sea anchors and trolling boards attached to it as it is towed into confining position about an oil spill;

FIG. 3 is a vertical sectional view of the barrier on a greatly enlarged scale;

FIG. 4 is a rear view of the barrier, as seen along broken line 4—4 of FIG. 3;

FIG. 5A is a top plan view and FIG. 5B is a horizontal sectional view of the hinge between sections of the barrier, as seen along broken lines 5A—5A and 5B—5B, respectively, of FIG. 4; and FIG. 6 is a partial view of the yieldable attachment of the permanent anchors to bridles on the barrier.

With reference now to the details of the above-described drawings, the offshore drilling platform 11 shown in FIG. 1 is surrounded by the barrier 10 and supports equipment suitable for drilling one or more wells into the earth's surface beneath the water level at the offshore location. These wells include pipes which extend downwardly through the water and into the earth from heads 13 supported on the platform. In the event a leak should occur from one or more of the wells, the oil spill which might accumulate in and around the platform 11 would be confined by the barrier 10.

The oil spill 12 shown in FIG. 2 is confined on three sides by the barrier 10, which is held in a U shape. Preferably, the barrier is disposed with both the tide and the prevailing wind moving from right to left — i.e., in a direction into the U.

As illustrated diagrammatically in FIG. 1, the barrier 10 is held in a substantially stationary position by means of a plurality of permanent anchors 14 connected by lines 15 to the back side of the barrier. The opposite ends of the barrier are spaced apart to provide an opening into the righthand end of the area surrounding the platform, and a floating vessel 16 is disposed within the opening with its front end facing the platform. A suction pump 17 is supported on the vessel and carries a suction head 18 which depends from the front end of the vessel for siphoning up any oil spill which might occur. The pump leads to a separator 19 which is also carried by the vessel so that oil from the spill may be conveyed through a line 20 to a barge or other suitable place of disposal, and sea water separated from the spill may be dumped through a line 21 back into the body of water.

Obviously, the opposite ends of the barrier may be releasably anchored to the sides of the vessel 16 in any suitable manner. It's further obvious that the vessel may be left in position within the opening in the barrier, particularly when danger of oil spill is imminent, or that, alternatively, the vessel may be moved into position only when such need appears. In the latter case, the ends of the barrier 10 may be connected to one another to completely surround the platform 11.

The vessel 16 and associated parts are shown in FIG. 2 in a position in which the suction head 18 is over the oil spill 12 for siphoning it through the pump 17 into the separator 19. Obviously, as the spill is collected, the vessel 16 may be moved forwardly or to the left, or the barrier may be moved toward the vessel, so as to maintain the suction head 18 over the remainder of the spill. The barrier is held in confining position during this time by means of sea anchors 22 and trolling boards 24 connected by lines 15 to the back side of the barrier.

The barrier 10 is moved into the positions of FIGS. 1 and 2, and is held in the position of FIG. 2 by means of towing vessels 25 connected to the opposite ends of the barrier. During the time that the barrier is being moved to a location in which it is to be used, it may be pulled at one end by a single pulling vessel. Then, when disposed at the desired location, the opposite ends of the barrier may be manipulated by the vessels 25 at both its ends to move it into confining position.

When the barrier is used in the manner illustrated in FIG. 1, the tow vessels may be disconnected from it for use at other locations. When the barrier is used as shown in FIG. 2, the tow vessels continuously guide the opposite ends of the barrier. Also, of course, the tow vessels may be used to move the oil spill itself either toward the vessel 16 or toward another location.

In any event, the particular manner in which the barrier may be manipulated will be readily apparent to one skilled in the art. Also, of course, the permanent anchors 14 as well as the sea anchor 23 and trolling boards 24 may be of well known construction, with the exception to be noted insofar as the preferred attachment of the permanent anchors to the barrier is concerned. Similarly, the barge 16 and its associated parts may be of conventional construction, and thus need not be described in detail.

As best shown in FIG. 4, and as indicated diagrammatically in FIGS. 1 and 2, the barrier 10 is made up of sections 10A which are hingedly connected to one another along the length of the barrier. Each such section is made up of a relatively rigid framework 26 which is triangular in cross section and comprised of horizontally disposed frame members 26A, 26B, 26C and 26D along the upper, intermediate and lower edges of the barrier, and upper and lower forward inclined frame members 26E and 26F.

As best shown in FIG. 4, the upper frame members 26A are fixedly connected to the intermediate frame members 26B and 26C by means of frame members 26E, frame member 26G is fixedly connected to frame member 26D, and the upper ends of the frame members 26F are pivotally connected to intermediate frame members 26C. The frame members 26E and 26F are held in the inclined positions by means of vertically extending frame members 26C which are pivotally connected to and extend from the upper frame members 26A to the lower frame members 26C.

The angularly disposed upper and lower faces on the front side of the framework 26 are covered by rubber belting or other suitable impervious material. Thus, as shown in the drawings, one such covering 29 extends laterally between the ends and vertically between the upper frame members 26A and intermediate frame members 26 of the upper portion of each barrier section. Another covering 30 extends between the ends and vertically between frame members 26C and 26D of each barrier section. The upper edge of the barrier 30 is sealed with respect to the barrier 29.

Alternatively, of course, the covering may comprise a single layer extending over the upper face of the front side of the frame, down around the frame members 26B, upwardly along the back side of the overlapping portion of frame members 26E, and then downwardly over the lower face of the front side of the frame. In any event, the layers of rubber belting or the like provide an impervious covering over the front side of the barrier between its upper and lower edges and its opposite end edges.

In any event, the portion of the frame between frame members 26B and 26C is covered to provide an impervious lip extending laterally across the barrier section. More particularly, this lip forms a forwardly and downwardly extending continuation of the upper face of the barrier, which is spaced from the upper end of the lower face of the barrier to form a void therebetween.

A buoyant element 27, which preferably comprises an elongate, inflatable bladder, is carried on the back side of the framework 26 of each barrier section 10A by means of one or more straps 28 disposed about the element 27 and secured to the frame members 26E. As will be apparent from FIG. 3, the buoyant element is so arranged on the frame that it will, when disposed in a body of water, maintain the frame members 26G in a substantially vertical position and maintain the frame members 26C at the lip and preferably the intersection of the frame members 26E and 26F at a level beneath the upper surface of the body of water. More particularly, and as will be apparent from FIG. 3, the intersection of the upper and lower faces of the barrier is maintained beneath an oil level above the heavier phase of the body of liquid. Thus, the center of buoyancy of the buoyant element 27 is disposed on a level above the intersection and to he rear thereof, and preferably generally vertically above the center of gravity of the frame.

As best shown in FIGS. 5A and 5B, the opposite end edges of the covering are connected to hinge members making up the hinged connection between barrier section. Thus, each end edge of each layer of one barrier section is fastened to hinge member 31, and each end edge of each layer of an adjacent barrier section is fastened to hinge member 32. As will be apparent from the drawings, the hinge members interfit as in a piano type hinge and receive a hinge pin 33 through aligned holes. However, as distinguished from a conventional hinge, the openings in the interfitting hinge members 31 and 32 are of progressively wider construction in a direction toward the upper edge of the barrier. This permits the effective length of the upper edge of the barrier to increase as the barrier sections bend relative to one another.

As will also be apparent from FIGS. 5A and 5B, the impervious covering for the barrier sections include portions at each end which overlap the hinge and thus one another. Thus, for example, the layer 29 of one barrier section includes an end portion 29A fastened to the edge of its main portion, and the layer 29 of the adjacent barrier section includes a similar portion 29B fastened to the edge of its main portion. End portion 29A extends over the back side of the hinge, and the other end portion 29B extends over the front side of the hinge. More particularly, each such end portion has an end edge which is normally turned inwardly so as to engage against the adjacent face of the main portion of the layer 29 of the other barrier section. Thus, these overlapping portions will render the connections between the barrier sections impervious.

As shown in FIG. 3, a bridle 35 is connected to the back side of the barrier section 10A for attachment to the line 15 extending to one of the previously described anchors or trolling boards. More particularly, the upper and lower lines of the bridle 35 connect with an elliptically shaped ring 36, which in turn is connected to the end of the line 15.

As will also be apparent from FIG. 3, the bridle 35 may be connected in a widespread position to fasteners 37 adjacent the upper and lower edges of the bridle, or in a less widespread position (as indicated by broken lines in FIG. 3) to fasteners 37 disposed along the back side of the barrier generally intermediate the upper and lower edges of the barrier. As will be appreciated, the elliptical ring 36 connecting the bridle to the line 15 will adapt to these different positions of the bridle. The fasteners 37 on the upper portion of the barrier section are connected to the back sides of frame members 26E, and the fasteners 37 on the lower portion of the back side of the barrier section are connected to the back sides of frame members 26F.

As shown in FIG. 6, the lower ends of the line 15 are connected to permanent anchors 14 disposed beneath the water level by means of reels 38 about which the line 15 is disposed. These reels include a torsion spring or similar mechanism for yieldably urging the lower ends of the lines 15 downwardly.

As previously described, and as will be apparent from the foregoing, with the lip on the front side of the barrier beneath the oil level, oil will ordinarily not move beneath the lip and thus over the lower face on the front side of the barrier. However, in rough waters, it's possible that some of the oil would nevertheless move beneath the lip. Also, of course, some oil will ordinarily be in the water phase for at least some depth beneath the solid oil level. In any event, however, the lip will create eddy currents which positively resist travel of the liquid downwardly along the face of the layer 30. That is, liquid moving past the lower edge of the lip creates a void in the space behind the lip, and the lower pressure in the void creates a counter-clockwise eddy current, because the flow of liquid will normally move in the direction of least resistance. This counterclockwise eddy current will bring any liquid which moves past the lower edge of the lip back up under the lip.

As previously described, in its preferred use, the barrier 10 is held in the U shape of FIG. 2 so that both wind above the liquid level and the tide below the liquid level move in a direction against the side of the barrier — i.e., from right to left in FIG. 3. As previously described, the movement of air over the upper face of the front side of the barrier will, due to the air foil effect, create an upwardly directed force on the upper face of the barrier. The movement of the tide over the lower face will, on the other hand, create a downwardly directed force on the lower face, and these forces cooperate with one another to assist the barrier in maintaining its normally upright position.

The barrier is also urged to its upright position by means of the bridle 35 attaching it to one or more of the previously described anchors or trolling boards. The adjustable connection of the bridle to the barrier enables the barrier to be used to best advantage in varying weather conditions. That is, in rough seas, the bridle would normally be disposed in a widespread position shown in solid lines in FIG. 3. In calmer seas, the bridle would normally be used in a less widespread position, as indicated in broken lines in FIG. 3. Thus, the barrier is movable to a more widespread position to provide more stabilization in the event of more active conditions of the wind and tide.

Under the average conditions, the upper face on the front side of the barrier should extend at an angle of about 25° to the vertical and the lower face should extend at an angle of about 35° to the vertical. Thus, an angle substantially greater than 25° tends to create too much of an upward force on the front face and thus too much lift. Conversely, a substantially smaller angle provides too much resistance to forward pull of the barrier. In like manner, an angle of substantially greater than 35° on the lower face of the front side of the barrier provides too great a downward force, which has a tendency to pull the oil downwardly past the lip on the front side of the barrier. In any case, however, the optimum angular relationship of the front faces of the barrier will vary somewhat from these values under different air and weather conditions.

I have found that with a barrier having a front face with a vertical length of about six feet and a lower face with a vertical length of about seven feet, the lip may have a vertical length of about one foot.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. Apparatus for use in confining and/or collecting a lighter phase above a heavier phase of a body of liquid comprising an elongate, barrier which is flexible intermediate its longitudinal ends and has upper and lower faces which are impervious and converge to an apex on the front side of the barrier, and buoyant means for normally maintaining the barrier in a generally upright position within said body of liquid and with the apex below said lighter phase.

2. Apparatus of the character defined in claim 1, including a permanent anchor yieldably connected to the barrier.

3. Apparatus for use in confining and/or collecting a lighter phase above a heavier phase of a body of liquid, comprising an elongate barrier including a plurality of hingedly connected sections intermediate its longitudinal ends, each section having a relatively rigid open framework having upper and lower portions which converge to an apex on the front side of the section, and a flexible, impervious covering over the front sides of the sections, and buoyant means carried by the framework for normally maintaining the barrier in a generally upright position within said body of liquid and with the apex below said lighter phase.

4. Apparatus of the character defined in claim 3, wherein the flexible covering includes covers on each framework section overlapping its connection with adjacent section.

5. Apparatus of the character defined in claim 3, wherein the buoyant means comprises a buoyant element attached to the back side of each framework section.

6. Apparatus of the character defined in claim 3, wherein each framework section includes vertical bracing on the back side thereof between the upper and lower portions.

7. Apparatus for use in confining and/or collecting a lighter phase above a heavier phase of a body of liquid, comprising an elongate barrier which is flexible intermediate its longitudinal ends and has upper and lower faces which are impervious and converge to an apex on the front side of the barrier, a lip which extends downwardly from the apex and has an impervious front face, and buoyant means for normally maintaining the barrier in a generally upright position within said body of liquid and with the lower edge of the lip below said lighter phase.

8. Apparatus of the character defined in claim 7, wherein the front face of the lip forms a substantial continuation of the upper face.

9. Apparatus for use in confining and/or collecting a lighter phase above a heavier phase of a body of liquid, comprising an elongate barrier including a plurality of hingedly connected sections intermediate its longitudinal ends, each section having a relatively rigid framework having upper and lower portions which converge to an apex on the front side of the section, the connection between adjacent sections including a pin extending through overlapping holes in adjacent edges of the sections, with the holes increasing in width in directions away from the apex, and a flexible, impervious covering over the front sides of the sections, and buoyant means carried by the framework for normally maintaining the barrier in a generally upright position within said body of liquid and with the apex below said lighter phase.

10. Apparatus for use in confining and/or collecting a lighter phase above a heavier phase of a body of liquid, comprising an elongate barrier including a plurality of hingedly connected sections intermediate its longitudinal ends, each section having a relatively rigid framework having upper and lower portions which converge to an apex and a lip which extends downwardly from the apex on the font side of the section, and a flexible, impervious covering over the upper and lower portions and lip of the front sides of the sections, and buoyant means carried by the framework for normally maintaining the barrier in a generally upright position within said body of liquid and with the lower edge of the lip below said lighter phase.

11. Apparatus for use in confining and/or collecting a lighter phase above a heavier phase of a body of liquid, comprising an elongate barrier which is flexible intermediate its longitudinal ends and has upper and lower relatively thin walls having faces which are impervious and converge to an apex to provide a convex front side and a concave back side of the barrier, and buoyant means for normally maintaining the barrier in a generally upright position within said body of liquid and with the apex below said lighter phase.

12. Apparatus of the character defined in claim 11, including means hingedly connecting the upper and lower walls, and means for holding said walls in fixed angular relation to one another.

13. Apparatus of the character defined in claim 11, wherein said buoyant means is attached to the back side of the barrier.

14. Apparatus for use in confining and/or collecting a lighter phase above a heavier phase of a body of liquid, comprising an elongate barrier which is flexible intermediate its longitudinal ends and has upper and lower faces which are impervious and converge to an apex on the front side of the barrier, and buoyant means attached to the back side of the barrier for normally maintaining the barrier in a generally upright position within said body of liquid and with the apex below said lighter phase.

15. Apparatus of the character defined in claim 14, including means hingedly connecting the upper and lower faces, and means for holding the faces in fixed angular relation to one another.

16. Apparatus for use in confining and/or collecting a lighter phase above a heavier phase of a body of liquid, comprising an elongate barrier which is flexible intermediate its longitudinal ends and has upper and lower walls having faces which are impervious and converge to an apex on the front side of the barrier, buoyant means for normally maintaining the barrier in a generally upright position within said body of liquid and with the apex below said lighter phase, means hingedly connecting the upper and lower walls, and means for holding said walls in fixed angular relation to one another.

* * * * *